May 18, 1954  A. T. BRUESEWITZ ET AL  2,678,670
SLICE GROUPING MECHANISM FOR SLICING MACHINES
Filed July 15, 1950  4 Sheets-Sheet 3

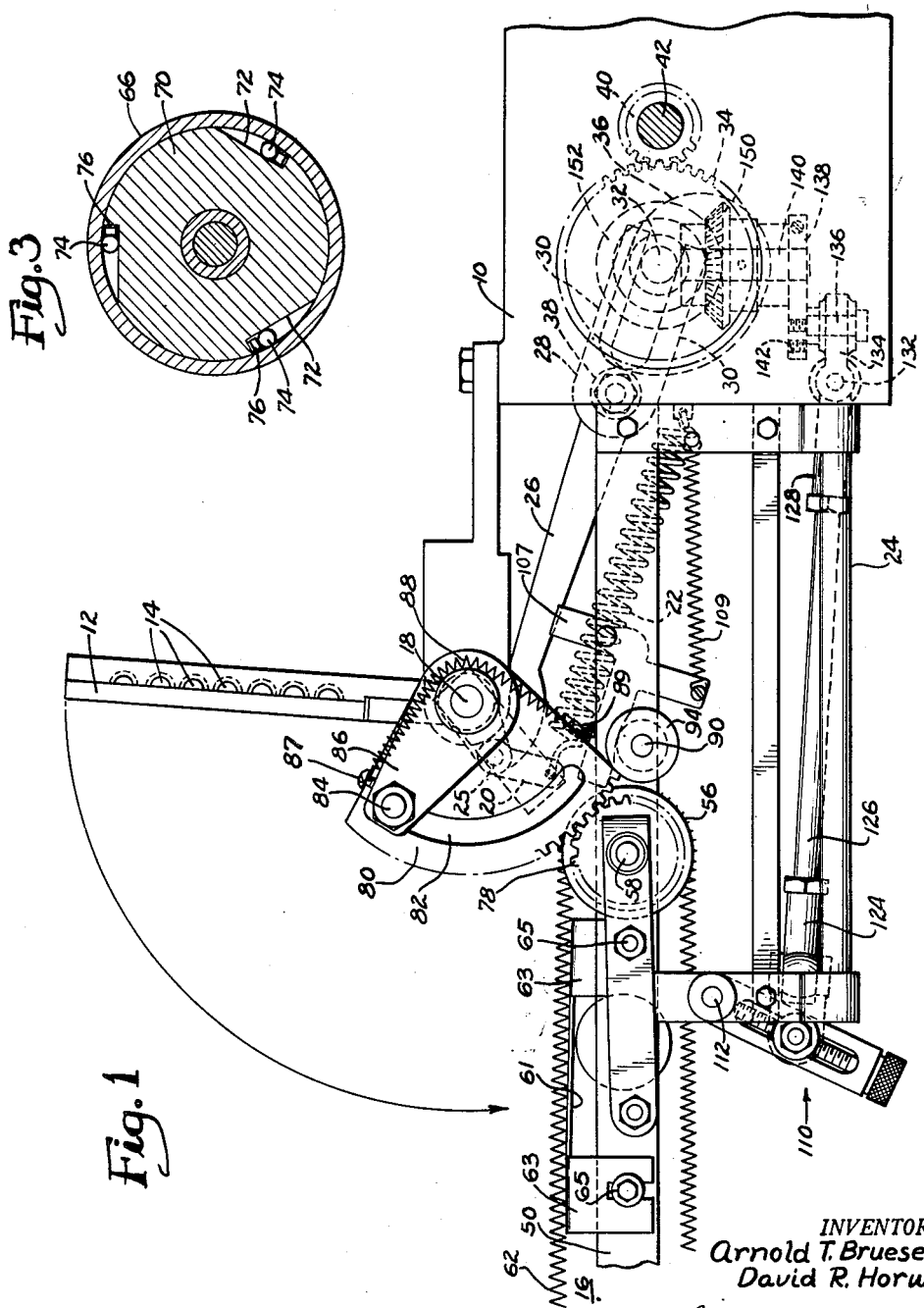

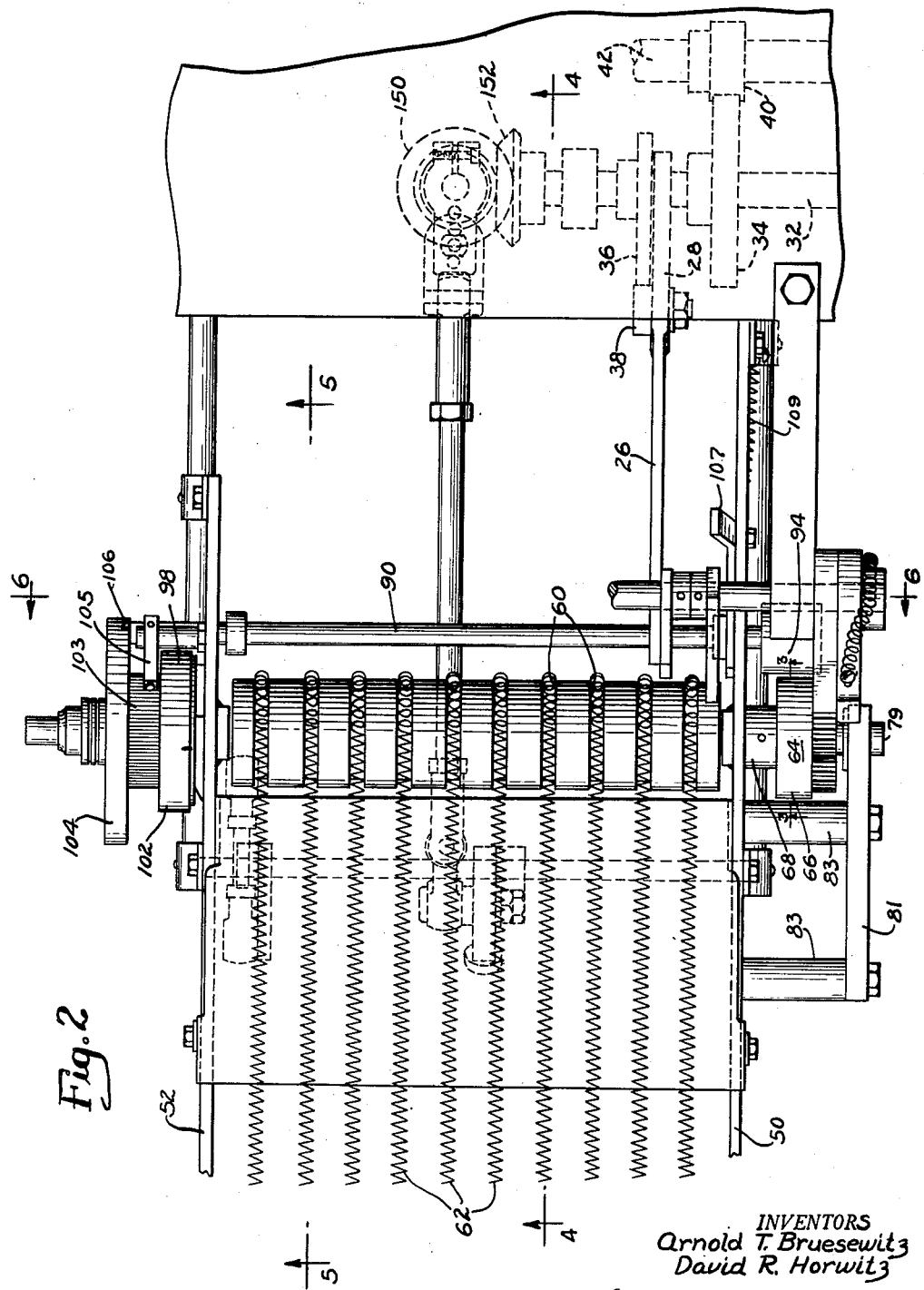

INVENTORS
Arnold T. Bruesewitz
David R. Horwitz by: Spencer, Johnston, Cook & Root
Attys.

INVENTORS
Arnold T. Bruesewitz
David R. Horwitz by: Spencer, Johnston, Cook & Root
Attys.

Patented May 18, 1954

2,678,670

UNITED STATES PATENT OFFICE 2,678,670

SLICE GROUPING MECHANISM FOR SLICING MACHINES

Arnold T. Bruesewitz, Milwaukee, and David Robert Horwitz, Sheboygan, Wis., assignors to U. S. Slicing Machine Company, Inc., La Porte, Ind., a corporation of Indiana Application July 15, 1950, Serial No. 173,974

6 Claims. (Cl. 146—94)

The present invention relates to a grouping device operative in connection with a slicing machine, as for example, a food slicer in which slices are cut from a body or block of foodstuff, as for example meat, and transferred to a conveyor.

It is among the principal objects of the present invention to provide a device for grouping slices severed from the body of foodstuff and forming them into stacks on a conveyor and moving such stacks on the conveyor after each stack has been formed in order to produce spaced stacks or groups of slices which may readily be handled and packaged.

Another object of the invention is to provide an apparatus of the character briefly described above which operates in response to the movement of the fly of the meat slicing machine with which the apparatus is associated.

Another object of the invention is to provide a grouping device of this character including a conveyor for receiving the slices as they are cut from the body of foodstuff and which conveyor remains stationary during the operation of the fly in order that the latter may place the slices on the conveyor in stacked relationship and in which the repeated movements of the fly operate through a cumulating device to ultimately effect a step movement of the conveyor when the desired number of slices which cooperate to make up a stack have been accumulated thereon so that the step movement of the conveyor will carry the stack away from the vicinity of the fly and create a region on the conveyor in the vicinity of the fly for accumulation thereon of the next succeeding stack of slices.

In carrying out this last mentioned object, the invention contemplates the provision of an endless conveyor having a receiving end positioned to receive successive slices as they are delivered from the main body of foodstuff while the conveyor remains stationary in order to permit the slices to accumulate into a stack containing the desired number of slices. The conveyor is adapted to be moved in step by step fashion under the influence of the movements of the slice transferring fly. A one-way engaging device or clutch is operatively disposed between the fly shaft and the driving shaft for the conveyor and a lost motion connection is normally maintained in effect so that the movements of the fly shaft will not be transferred through the one-way engaging device to the drive shaft of the conveyor, the lost motion connection being maintained in effect by virtue of a blocking member forming part of a cumulating device by means of which the number of successive movements of the fly shaft are accumulated until a predetermined number of fly shaft movements have taken place. After the predetermined number of fly shaft movements, representing the number of slices which cooperate to make up a single stack, have been performed the blocking member is released and the lost motion connection then becomes ineffective so that the next successive movement of the fly shaft during the return stroke of the fly operates to positively drive the conveyor through the one-way engaging device and index or step the same so that the accumulated stack is carried away from the vicinity of the fly. After the conveyor has thus been stepped, the blocking device is restored to its blocking position and the lost motion device again renders the fly shaft ineffective to advance the conveyor until such time as sufficient repeated operation of the fly have again built up a stack on the conveyor.

Another object of the invention is to provide a grouping device for slicing machines which separates the cut slices into individual groups of a predetermined number of slices and is readily adjustable to vary the number of slices in each individual group whereby different desired quantities of weights of sliced material may be measured out and adapted for ready packaging. Other objects and advantages of the invention will be apparent by reference to the following description in conjunction with the accompanying drawings, in which:

Fig. 1 is a side elevational view of a machine constructed in accordance with the principles of the present invention;

Fig. 2 is a top plan view of the apparatus shown in Fig. 1;

Fig. 3 is a sectional view taken through a one-way engaging device employed in connection with the present invention, this figure being a section substantially along the line 3—3 of Fig. 2;

Figure 4:
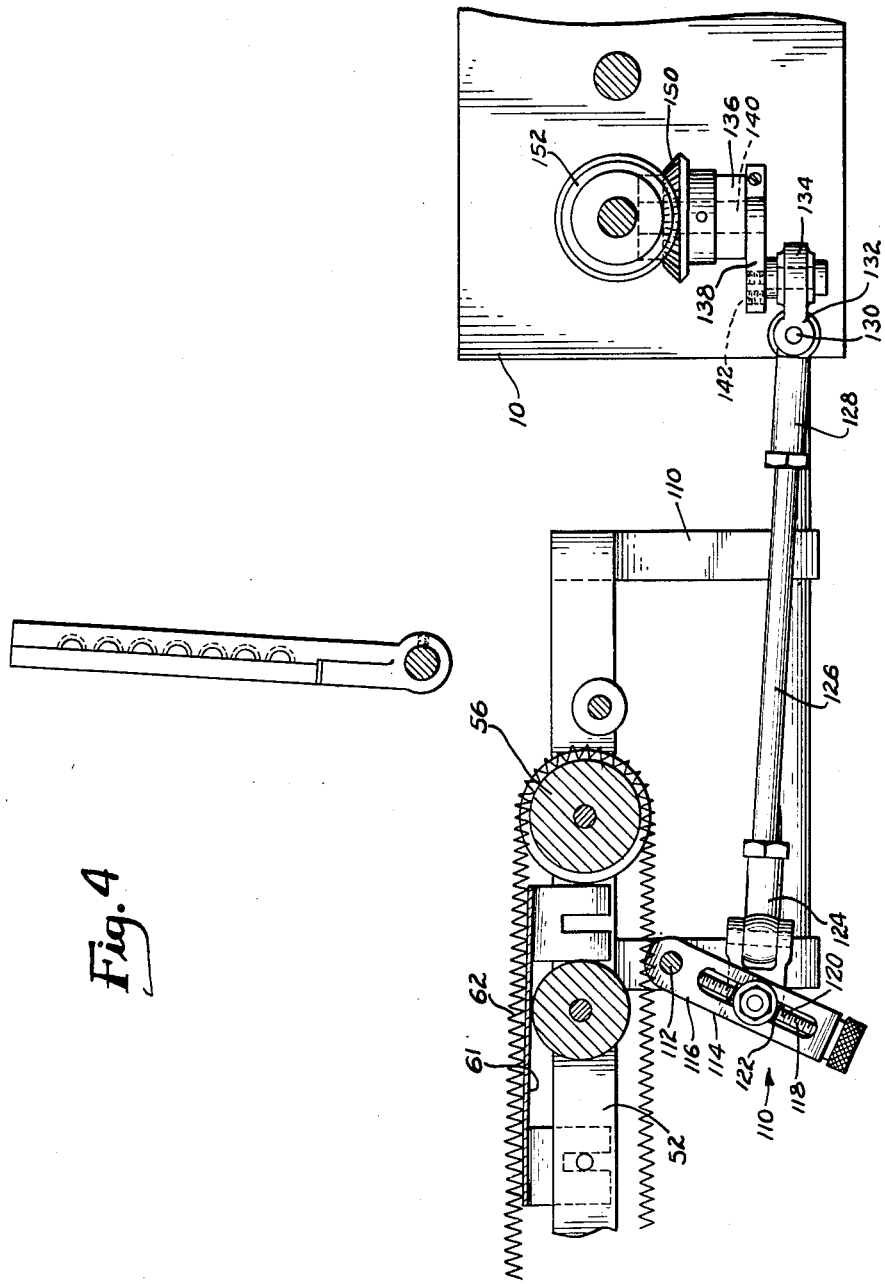
Fig. 4 is a sectional view taken substantially along the line 4—4 of Fig. 2.
Figure 5:
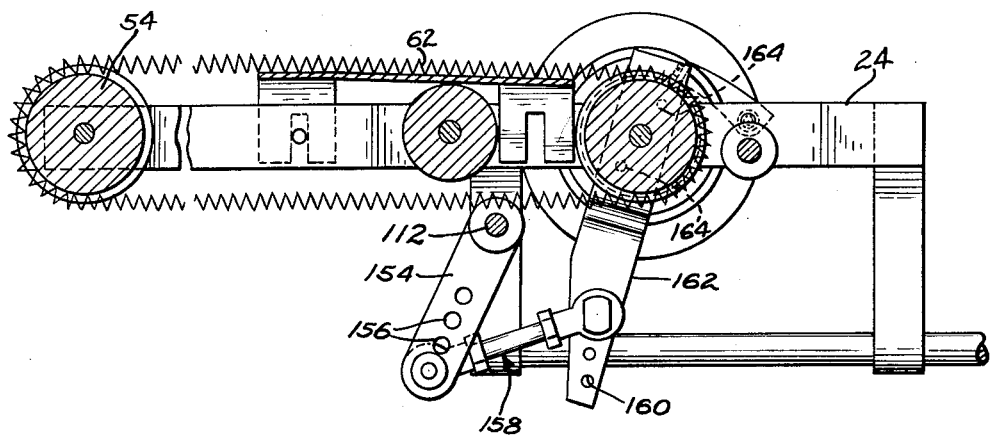
Fig. 5 is a sectional view taken substantially along the line 5—5 of Fig. 2.

The present invention is applicable to slicing machines of the general type illustrated by the patent to Stiles No. 1,231,959, for a Meat Stacker, although the same may, with or without modification, be designed for use in connection with various types of slicing machines having a movable fly element for conveying the slices of foodstuff from the main body thereof to a conveyor mechanism. Slicing machines of this type include an endless prong receiver adapted to receive each slice as it is severed and to convey it past a fly having spaced fingers adapted to move between the prongs of the receiver and forcibly eject the slices from the prongs by movement back and forth to thereby discharge the slices successively onto a receiving plate form of conveyor.

The grouping device comprising the present invention is adapted to periodically move the conveyor in response to successive cumulative movements of the fly, with the movement of the conveyor being capable of adjustment relative to the cumulative movements of the fly to permit a greater or lesser number of slices accumulated in a stack before the conveyor is moved or stepped to a new position.

Referring now to the drawings in detail and particularly to Figs. 1 and 2, a slicing machine of the type illustrated in the previously mentioned United States Patent No. 1,231,959 is designated in its entirety at 10, and only such portions of the slicing machine as are pertinent to the present grouping device have been illustrated. The slicing machine involves in its general organization a fly 12 which is provided with fingers 14 to remove the slices from the conventional prongs (not shown) associated with the slicing and delivery mechanism of the machine. The fly 12 is adapted to be reciprocating from a substantially vertical position, as shown in Fig. 1, to a horizontal position, and on each downward movement it deposits a slice of foodstuff on an endless conveyor mechanism designated in its entirety at 16 and comprising a part of the improved grouping mechanism of the present invention.

The fly 12 is secured to an oscillating fly shaft 18 which extends transversely of the machine and the latter is operated by means of an arm 20 which is rigidly connected to the fly shaft 18 and which has its free end connected to one end of a spring 22, the other end of which is connected to a stationary part of the slicing machine framework 24. The arm 20 is pivoted medially of its ends by means of a pin 25 to a cam operated lever 26 having a yoke portion 28 provided with arms 30 which straddle a shaft 32 which extends transversely of the machine framework. The shaft 32 therefore serves as a guide to control the reciprocating movement of the lever 26. The shaft 32 has mounted thereon a gear 34 having secured thereto a cam member 36 designed for cooperation with a cam roller 38 carried by the yoke 28.

From the above description of parts it will be seen that upon rotation of the gear 34 the cam roller 38, which is caused to bear against the periphery of the cam member 36, will cause reciprocating movements of the lever 26 and consequent oscillating movements of the arm 20, thereby oscillating the fly shaft 18 and causing the fly 12 to be oscillated between its vertical and horizontal positions. The gear 34 is adapted to be driven by a small gear 40, hereinafter referred to as the fly gear, mounted on the fly driving shaft 42 of the slicing machine.

The arrangement of parts described above is purely conventional and no claim is made herein to any novelty associated therewith, the novelty of the present application residing rather in the construction, combination and arrangement of parts of the grouping mechanism about to be described.

Still referring to Figs. 1 and 2, the conveyor 16 includes a pair of elongated parallel longitudinally extending frame members 50 and 52 which are suitably connected to and, at least in part, supported from the framework 24 of the slicing machine and which carry therebetween at their extreme rear ends a driven conveyor pulley 54. The frame members also carry adjacent their forward ends a driving pulley 56 mounted on a shaft 58 rotatably journaled between the frame members 50 and 52. The driven and driving pulleys 54 and 56 may be in the form of cylindrical members having a series of annular grooves 60 formed therein and extending therearound, which grooves are adapted to receive therein a series of elongated endless garter spring conveying members 62 which pass around the two pulleys and which, in the straightaway portion of the conveyor, constitute the moving endless supporting members onto which the slices of foodstuff delivered from the slicing machine is adapted to become stacked and on which they are adapted to become grouped in a manner that will be made clear presently.

A table or shelf 61 having depending side flanges 63 adjustably secured by studs 65 to the frame members 50 and 52 underlies the spring conveyor members 62 in the proximity of the stack forming region of the conveyor 16 to mechanically reinforce the members and prevent them from sagging under the weight of the stack as it is progressively formed or built up on the conveyor.

The driven pulley 54 is, of course, an idler pulley while the driving pulley 56 is adapted to be driven periodically through the medium of a one-way engaging device or clutch 64 (see also Fig. 3) associated with the shaft 58 on which the pulley 56 is mounted. The one-way engaging device or clutch 64 includes an outer cup-shaped casing 66, which constitutes the driven element of the device and is suitably secured as at 68 to the shaft 58, and an inner driving member 7 which is rotatably disposed within the driven member 68. A series of notches or recesses 72 is provided in the inner driving member and receive therein the usual clutch rollers 74 which are spring pressed as at 76 in a direction tending to normally cause the rollers to bind between the inner surfaces of the recesses 72 and the inner circumferential wall of the driven member 68. Thus, such a conventional one-way engaging device will permit the inner driving member 70 to rotate or overrun the driven member 68 in a counterclockwise direction as viewed in Fig. 3 without disturbing the position of the latter, while rotation of the driving member 70 in a clockwise direction will cause the rollers 74 to become wedged in their respective recesses and effect a direct drive between the inner and outer members 70 and 68, respectively. With the driving and driven members thus connected in driving relationship, the one-way device 64 may be said to be engaged.

The driving member 70 of the one-way engaging device 64 has integrally formed therewith a gear 78 which constitutes the driving gear for the conveyor 16 and which is adapted to be periodically driven under the influence of the oscillating movements of the fly shaft 18 in a manner and for a purpose that will be made clear presently.

The gear 78 is carried on and supported by a stud shaft 79 which receives its support in a bracket 81 which is spaced outwardly from the frame member 50 and which is secured thereto by means of spacing collar and stud assemblies 83.

Still referring to Figs. 1 and 2, the fly shaft 18 has loosely mounted thereon adjacent one end thereof a gear sector 80, the teeth of which mesh with the peripheral teeth of the gear 78. The gear sector 80 is formed with an arcuate slot 82 adjacent its periphery which receives therein a pin 84 carried at the outer end of an arm 86, the inner end of which is rigidly secured to the fly shaft 18. A spring 88 is secured at one end to a pin 87 projecting from one edge of the gear sector 80 and at the other end to a pin 89 projecting from an edge of the arm 86, while the medial region of the spring is coiled or bent about the fly shaft 18, so that the tendency of the spring 88 is to constrain the gear sector 80 to normally follow the movements of the arm 86, which in turn follows the oscillating movements of the fly shaft 18.

The gear sector 80 is preferably in the form of a quadrant and therefore is adapted to displace itself upon movement of the fly 12 downwardly from its vertical position to its horizontal position when the gear sector 80 moves with the arm 86 thus causing the gear 78 and driving element 70 of the one-way engaging device or clutch to rotate freely in a clockwise direction as viewed in Fig. 2 without disturbing the position of the conveyor proper. The pin and slot connection 82, 84 however constitute in effect a lost motion connection between the gear sector 80 and the fly shaft 18 so that when the gear sector 80 is blocked, intercepted or otherwise prevented from following the movements of the arm 86, the gear sector will remain stationary and no such free movement of the driving element of the one-way engaging device obtains.

According to the present invention interceptor means are provided for blocking the movements of the gear sector 80 during a predetermined number of movements of the fly 12 and consequently during the time that a stack of food slices is being built up in the forward regions of the conveyor 16 and for thereafter releasing the sector to permit the latter, through the medium of the one-way engaging device or clutch 64, to advance or step the conveyor through a predetermined degree of movement to advance the completely built up stack and carry the same along the conveyor a distance sufficient to clear the forward region of the conveyor 16 for subsequent stack forming operations.

Accordingly, an interceptor bar 90 is slidably supported in openings 92 provided in the frame members 50 and 52 and carries at one end thereof, outside of the frame member 50, an interceptor collar 94 which is movable with the bar 90 from an advanced position wherein it is disposed in the path of movement of the gear sector 80 to a retracted position wherein it is out of the path of movement of the sector. The other end of the interceptor rod 90 is recessed as at 91 and a plunger 93 is slidably disposed in the recess 91 and is normally urged outwardly by means of a spring 96. The spring 96 and plunger 93 constitute a lost motion connection, the function of which will appear presently. A second spring 97 surrounds the rod 90 and bears at one end against the frame member 52 and at the other end against a cross pin 99 which projects through aligned slots 101 formed in the recessed end of the rod 90 and which passes through and is secured in the plunger 93. The tension exerted by the spring 97 is somewhat greater than the tension exerted by the spring 96 and as a consequence any thrust exerted upon the plunger 93 tending to move the same into the recess 91 will force the rod 90 to its advanced postion while at the same time compressing the spring 97. The pin 99 and slot 101 determine the limits of sliding movement of the plunger 93 in the recess 91. A collar 95 on the rod 90 is adapted to bear against the frame member 50 to limit and determine the advance position of the rod 90.

The driving shaft 58 of the conveyor 16, i. e. the shaft on which the conveyor driving pulley 53 is mounted, has mounted thereon a second one-way engaging device or clutch 98 (see also Figs. 4 and 6) similar to the one-way engaging device 64 and which is positioned on the shaft 58 outside of the frame member 52 at the end of the shaft 58 opposite the one-way engaging device 64.

The one-way engaging device 98 includes an inner driving member 100 which is loosely disposed on the shaft 58 and an outer driven member 102, the two members 100 and 102 being operatively connected together in one-way driving relationship by suitable driving means which has not been illustrated herein but which may be of the inclined wedge type similar to that shown in connection with the one-way engaging device shown in Fig. 3.

The driven member 102 of the one-way engaging device 98 is provided with a reduced ratchet portion or wheel 103 which may be integrally formed therewith and the ratchet wheel has secured thereto an interceptor disc 104 having a notch 106 formed in the peripheral regions thereof and designed for register with the end of the plunger which projects from the recessed end of the rod 90. The end of the plunger 93 may be bevelled as at 108 to facilitate entry thereof into and removal thereof from the notch 106 as will be described presently. The driven member 102 may receive its support from the shaft 58, and toward this end the shaft may extend through the ratchet portion 103 and interceptor disc 104 so that the latter are loosely disposed on the shaft 58. A pawl 105 loosely mounted on the interceptor rod cooperates with the ratchet portion 103 of the one-way engaging device 98 and permits movement of the ratchet portion, and consequently of the interceptor wheel 104 in a direction counter to its normal direction of movement.

The interceptor disc 104 is adapted to be periodically rotated in a counterclockwise direction as viewed in Fig. 4 throughout predetermined increments of motion in timed relationship to the oscillating movements of the fly shaft 18 and consequently of the fly 12, and, during the period of time that a particular stack comprised of slices of foodstuff is being built up on the forward or stacking region of the conveyor 16, the bevelled end of the plunger 93 is adapted to ride upon the smooth inner surface of the interceptor disc 104 and the action of the spring pressed lost motion connection 97, 99, 101 exceeds that of the spring 96 so that the interceptor rod 90, together with the interceptor collar 94 is maintained in its advanced position in the path of movement of the gear segment 80. After a predetermined number of slices of foodstuff have been stacked upon the conveyor, and consequently after the interceptor disc 104 has been rotated throughout one complete revolution so that the notch 106 comes into register with the bevelled end of the rod 90, the end of the rod falls into the notch 106 under the influence of the spring 96 operating through the lost motion connection so that the rod 90 and interceptor collar 94 are moved to their retracted position and the collar is withdrawn from the path of movement of the gear segment 80 to permit an indexing movement of the conveyor to take place to advance the stack of foodstuff along the conveyor 16 in a manner soon to be described. A blocking or latch finger 107 is pivotally secured to the frame member 50 and is spring pressed as at 109 in such a direction as to enter the space between the collar 89 and the frame member 50 when the rod 90 assumes its retracted position. The latch finger 107 is positioned in the path of the pin 25 and is adapted to be engaged thereby when in its latching position to trip the latch and release the interceptor rod 90 at the end of the return stroke of the fly 12.

Referring now to Figs. 1, 2, 4 and 5 wherein the driving mechanism for periodically advancing the intercepter disc 104 throughout its increments of motion is best illustrated, a subframe assembly 110 is secured to and depends from each of the frame members 50 and 52 and the two assemblies serve to support therebetween a transverse rockshaft 112, the ends of which are journalled in the sub-frame assemblies 110. The rock-shaft 112 occupies a position below the conveyor proper 16.

An adjustable lever assembly 114 (Fig. 4) is secured to the rockshaft 112 and includes means whereby its effective extent may be lengthened or shortened for the purpose of varying the angular extent of the increments of motion periodically applied to the intercepter disc 104 to increase or decrease the number of slices of foodstuff desired to make up a single stack of the foodstuff.

The lever assembly involves in its general organization an outer cage member 116 the upper end of which is secured to the rock shaft 112 and which is provided with an elongated slot 118 therein along which there extends centrally an adjusting screw 120 rotatably journalled in the cage at the ends of the slot. A block 122 is threadedly received on the screw 120, is slidably disposed and guided in the slot 118 and pivotally carries thereon a socket member 124 which threadedly receives therein one end of a reciprocating link 126. The other end of the link 126 is threadedly received in a socket member 128 which is pivoted as at 130 between the bifurcations 132 of a yoke member 134 which is pivotally carried on an eccentric pin 136 capable of selective positioning or mounting on an eccentric plate 138 which is secured to a vertical shaft 140 suitably journalled in the machine framework and adapted to be rotated under the influence of the driving mechanism for the fly shaft 18. A series of holes 142 are provided in the eccentric plate 138 for selective reception of the eccentric pin 136.

The shaft 140 has mounted thereon a bevel gear 150 which meshes with a similar bevel gear 152 mounted on the shaft 32 which carries the driven gear 34 of the fly shaft driving mechanism.

From the above description of parts it will be seen that upon rotation of the fly shaft 18 and consequent rotation of the driven gear 34, motion is transmitted through the gears 152, 150, shaft 140, eccentric plate and pin 138, 136, adjustable link assembly 126 and adjustable lever assembly 114 to the rock shaft 112 so that the latter is oscillated about its axis in timed relationship to the movements of the fly shaft 18.

Figure 6:
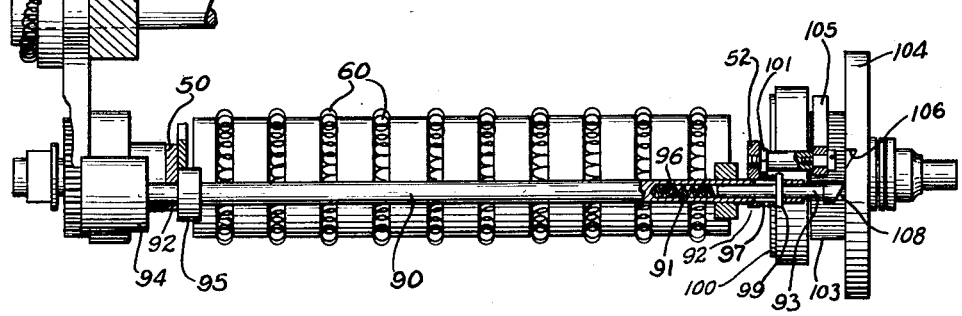
Fig. 6 is a sectional view taken substantially along the line 6—6 of Fig. 2.

The oscillating movements of the rock shaft are translated to the driving member 100 of the one-way engaging device 98 by means of a linkage system best illustrated in Fig. 6 and the unidirectional components of motion applied to the driving member 100 are applied to the driving member 102 and consequently to the interceptor disc 104. Accordingly, a lever 154 having a series of holes 156 therein designed for selective reception of an adjustable link assembly 158, similar to the link assembly including the link 126, is secured to the rock shaft 112. The other end of the link assembly 158 is adapted to be selectively received in one of a series of holes 160 provided in a lever 162 fixedly secured as at 164 to the outer face of the driving member 100 of the one-way engaging device 98.

The leverage afforded by the linkage system including the link 126 (Fig. 4) is thus compounded with the leverage afforded by the linkage system including the link 158 and a predetermined "stroke" is thus intermittently applied to the driving member 100 of the one way engaging device or clutch 98 tending to drive the driven member 102 thereof in a counterclockwise direction by the application of increments of predetermined angularity to the latter. The entire linkage system as a whole is possessed of a wide versatility of adjustment which in actual practice has been found capable of enabling the fly 12 to deliver slices of foodstuff from the body undergoing slicing for grouping in stacks of from five to fifty slices per group. Thus, the present grouping mechanism, when employed in connection with a slicing machine capable of being adjusted to accommodate sixty-four slices to the inch, gives the machine as a whole a wide range in the number of slices and weights of the individual stacks on the conveyor 16.

In the operation of the grouping apparatus during slicing operations the fly 12 is caused to oscillate in unison with the fly shaft 18 under the influence of the driving mechanism existing between the fly driving shaft 42, and each time the fly moves downwardly in a counterclockwise direction, as viewed in Fig. 1, a slice of foodstuff is delivered onto the food end of the conveyor 16 above the table 61 and, since the conveyor remains stationary throughout an appreciable length of time a predetermined number of the slices are placed one upon another successively so that ultimately a stack of slices is built up upon the conveyor. During the time existing from the placement of the first initial slice of foodstuff on the conveyor until the last slice in the stack has been deposited, the bevelled end of the plunger 93 rides on the smooth inner surface of the interceptor disc 104 in the periphery regions thereof. Since the rate of the spring 96 is greater than the rate of the spring 97, the interceptor rod 90, together with the interceptor collar 94 are held in their advanced positions with the collar 94 being positioned in the path of movement of the gear sector 80 and thus blocking its movements. Each time that the fly 12 moves downwardly with the fly shaft 18 turning in a counterclockwise direction as viewed in Fig. 1 the arm 86 moves therewith and travels in the slot 82 thus extending the spring 88 without effecting any movement of the gear sector 80. During such initial oscillations of the fly shaft 18 under the influence of the fly driving shaft 42 and gears 40 and 34, the latter gear operating through the gear 150, shaft 140, eccentric plate 138, eccentric pin 146, and linkage system, including the link 126 leading to the rock-shaft 112 and also through the linkage system leading from the rock-shaft 112 and including the link 158 and lever 162 serves to drive the driving member 100 with the one-way engaging device 98 in a counterclockwise direction as viewed in Fig. 6. Thus, upon each oscillating movement of the fly 12 small increments of motion, whose size depend upon the setting of the compound linkage system, are applied to the driven element 102 of the one-way engaging device and consequently to the interceptor disc 104, these increments of motion are accumulated between disc 104 and the interceptor rod 90 and coil 94 and are maintained in their advanced position until such time as the interceptor disc 104 has completed one full revolution, at which time the bevelled end of the plunger 93 moves into the notch 106 provided near the periphery of the disc 104, thus permitting the rod 90 and collar 94 to move to their retracted position. With the interceptor collar 94 thus removed from the path of movement of the gear sector 80, the lost motion connection including the slot 82 and arm 86 is rendered ineffective and the spring 88 then operates upon the next succeeding downward movement of the fly 12 to pull the gear sector 80 downwardly about its orbital path of movement, thus causing the driving element 70 of the one-way engaging device 64 to overrun the driven member 66 of the device 64. Upon return movement of the fly 12 the pin 84 engages an end of the slot 82 and forces the gear sector 80 in a clockwise direction thus rotating the gear 78 and the driving member 70 in a counterclockwise direction to step the conveyor a predetermined distance and cause the built up stack on the same to be removed from the vicinity of the stacking region of the conveyor.

As soon as the next stroke of the compound linkage mechanism occurs the interceptor disc 104 is advanced an additional increment of motion so that the end of the plunger 93 rides outwardly from the notch 106 and again moves the interceptor collar 94 into the path of movement of the gear sector 80 to permit a successive stack of food slices to be built up on the conveyor. The operation is continuous and as each successive stack is completed above the table portion of the conveyor the conveyor is indexed and the stack advanced along the conveyor.

The invention provides a new and improved apparatus designed for cooperation with a food slicing machine, such as a meat slicer, to group the slices onto a conveyor. The apparatus is characterized by simplicity and ease of operation; it is also compact, rugged and durable and requires very little modification of conventional meat slicers when applied thereto.

The invention is hereby claimed as follows:

1. The combination with a slicing machine having an oscillating fly shaft, of a movable conveyor positioned to receive the slices severed by the slicing machine in vertically stacked relationship, driving means operatively connecting the fly shaft and conveyor in driving relationship and including a lost motion connection, and cumulating means operable during a predetermined number of successive oscillating movements of the fly shaft for rendering said lost motion connection effective to in turn render said driving means ineffective to move said conveyor, said cumulating means constituting a one-way clutch member positioned between said fly shaft and said conveyor and a blocking member associated with said lost motion connection operative after a predetermined number of oscillations of the fly shaft and spring means for releasing said blocking member to render said driving means effective to move said conveyor a relatively great distance.

2. The combination with a slicing machine having an oscillating fly shaft, of a movable receiver positioned to receive the slices severed by the slicing machine in vertically stacked relationship, gear means for periodically moving said receiver in step-by-step fashion to conduct the stacked slices delivered thereto away from the slicing machine, means operatively connecting said receiver moving means and fly shaft in driving relationship and including a yieldable lost motion connection, a blocking member operable during the formation of a stack on said receiver for rendering said lost motion connection effective to in turn render said connecting means ineffective and prevent movement of the receiver by said receiver moving means, and spring means for releasing said blocking member, said spring means operable after a predetermined number of slices have been deposited on said receiver in vertically stacked relationship for rendering said lost motion connection ineffective to permit said connecting means to render said receiver moving means effective to stop the receiver.

3. The combination with a slicing machine having an oscillating fly shaft, of a movable conveyor positioned to receive the slices severed by the slicing machine in vertically stacked relationship, a one-way engaging device operatively connecting said fly shaft and conveyor in driving relationship and including a driving member and a driven member, a lost motion connection between said fly shaft and driving member, cumulating means operable during a predetermined number of successive oscillating movements of the fly shaft for rendering said lost motion connection effective to prevent driving of said driving member by said fly shaft thereby to prevent movement of said conveyor, said cumulating means constituting a one-way clutch member positioned between said fly shaft and said conveyor and a blocking member associated with said lost motion connection operative after a predetermined number of oscillations of the fly shaft and spring means for releasing said blocking member to render said lost motion connection ineffective and permit driving of said driving member by said fly shaft, thereby to move said conveyor a relatively great distance.

4. The combination with a slicing machine having an oscillating fly shaft, of a movable conveyor positioned to receive the slices severed by the slicing machine in vertically stacked relationship, one-way engaging means for driving said conveyor and including a driving element and a driven element, a gear mounted on said driving element, a gear segment mounted on said fly shaft and meshing with said gear, a yieldable lost motion connection between said gear segment and said fly shaft, interceptor means movable from a normally retracted position out of the path of movement of said gear segment to an advanced position wherein it is in the path of movement of said gear segment to prevent movement of the latter and consequent movement of said gear thereby to prevent movement of said conveyor, a cumulating device operable during a predetermined number of oscillations of the fly shaft for maintaining said interceptor means in the path of movement of said gear segment, said cumulating device being operable after a predetermined number of oscillations of the fly shaft to release said interceptor means and permit movement of the latter out of the path of movement of said gear segment, thereby to move said conveyor a relatively great distance.

5. The combination with a slicing machine having an oscillating fly shaft and a continuously rotatable fly driving shaft, of a movable conveyor positioned to receive the slices severed by the slicing machine in vertically stacked relationship, a driving pulley for said conveyor, a driving shaft for said pulley, a one-way engaging device mounted on said pulley driving shaft and including a driving element and a driven element mounted on said pulley driving shaft, a gear mounted on said driving element, a gear segment mounted on said fly shaft and meshing with said gear, a yieldable lost motion connection between said gear segment and said fly shaft, an interceptor member movable from an advanced position wherein it is in the path of movement of said gear segment to a retracted position wherein it is out of the path of movement of said gear segment, means yieldably maintaining said interceptor member in its retracted position, a second one-way engaging device including a driving element and a driven element, an interceptor disc carried by said driven element and having a surface positioned to engage said interceptor member and urge the same to its advanced position, there being a notch formed in the surface of said interceptor disc designed for reception of said interceptor member to permit the latter to move to its retracted position, an oscillating rock shaft, means translating the continuous movements of said fly driving shaft into oscillating movements of the rock shaft, means operatively connecting said rock shaft and last mentioned driving element whereby oscillating movements of the rock shaft are caused to impart rotational increments of motion to said latter driving element in a direction to drive said latter driven element, a latch member operable upon movement of said interceptor member to its retracted position for maintaining the latter retracted, and means operable upon movement of said fly for tripping said latch member.

6. The combination with a slicing machine having an oscillating fly shaft, of a movable conveyor positioned to receive the slices severed by the slicing machine in vertically stacked relationship, a one-way engaging device operatively connecting said fly shaft and conveyor in driving relationship and including a driving member and a driven member, a lost motion connection between said fly shaft and driving member, cumulating means operable during a predetermined number of successive oscillating movements of the fly shaft for rendering said lost motion connection effective to prevent driving of said driving member by said fly shaft, thereby to prevent movement of said conveyor, said cumulating means constituting a one-way clutch member positioned between said fly shaft and said conveyor and a blocking member associated with said lost motion connection operative after a predetermined number of oscillations of the fly shaft and spring means for releasing said blocking member to render said lost motion connection ineffective and permit driving of said driving member by said fly shaft, thereby to move said conveyor a relatively great distance, and adjusting means operatively associated with said cumulating means for predetermining the operation thereof in response to a determined number of oscillations of said fly shaft.

References Cited in the file of this patent

UNITED STATES PATENTS

| Number | Name | Date |
| --- | --- | --- |
| 1,310,261 | Van Berkel | July 15, 1919 |
| 1,310,262 | Van Berkel | July 15, 1919 |
| 1,376,775 | Luschka et al. | May 3, 1921 |
| 1,519,354 | Brown | Dec. 16, 1924 |
| 1,821,445 | Nestor | Sept. 1, 1931 |